United States Patent
Kim et al.

(10) Patent No.: US 8,948,501 B1
(45) Date of Patent: Feb. 3, 2015

(54) THREE-DIMENSIONAL (3D) OBJECT DETECTION AND MULTI-AGENT BEHAVIOR RECOGNITION USING 3D MOTION DATA

(75) Inventors: Kyungnam Kim, Oak Park, CA (US); Shankar R. Rao, Los Angeles, CA (US); Yuri Owechko, Newbury Park, CA (US); Swarup Medasani, Thousand Oaks, CA (US); Michael Cao, San Jose, CA (US); Jiejun Xu, Isla Vista, CA (US)

(73) Assignee: HRL Laboratories, LLC, Malibu, CA (US)

( * ) Notice: Subject to any disclaimer, the term of this patent is extended or adjusted under 35 U.S.C. 154(b) by 153 days.

(21) Appl. No.: 13/535,286

(22) Filed: Jun. 27, 2012

Related U.S. Application Data

(63) Continuation-in-part of application No. 12/644,349, filed on Dec. 22, 2009, now Pat. No. 8,620,089.

(60) Provisional application No. 61/501,589, filed on Jun. 27, 2011.

(51) Int. Cl.
*G06K 9/62* (2006.01)

(52) U.S. Cl.
USPC ........... 382/159; 382/173; 382/154; 345/419; 345/630

(58) Field of Classification Search
CPC ..... G06K 9/6256; G06K 9/66; G06K 9/6217; G06K 9/6282; G06F 17/30256
USPC .......................................... 382/159, 168–172
See application file for complete search history.

(56) References Cited

U.S. PATENT DOCUMENTS

| | | | |
|---|---|---|---|
| 2008/0046150 A1* | 2/2008 | Breed | 701/45 |
| 2011/0137527 A1* | 6/2011 | Simon et al. | 701/45 |
| 2011/0255741 A1* | 10/2011 | Jung et al. | 382/103 |

OTHER PUBLICATIONS

Chang et al: "Stereo-based vision system for automotive imminent collision detection", IEEE, 2004.*
Leibe et al: "Dynamic 3D scene analysis from a moving vehicle", IEEE, 2007.*
Morris et al: "A survey of vision-based trajectory learning and ana;ysis for surveillance", IEEE, 2008.*
Prokhorov, D.V. "Object recognition in 3D lidar data with recurrent neural network" IEEE Computer Vision and Pattern Recognition 9-15 (2009).

(Continued)

*Primary Examiner* — Ruiping Li
(74) *Attorney, Agent, or Firm* — Tope-McKay & Associates

(57) ABSTRACT

The present invention relates to an object detection and behavior recognition system using three-dimensional motion data. The system receives three-dimensional (3D) motion data of a scene from at least one sensor, such as a LIDAR sensor. An object is identified in the 3D motion data. Thereafter, an object track is extracted, the object track being indicative of object motion in the scene over time. Through Dynamic Time Warping (DTW) or other comparison techniques, the object track is compared to a database to identify the behavior of the object based on its object track.

19 Claims, 16 Drawing Sheets
(10 of 16 Drawing Sheet(s) Filed in Color)

(56) References Cited

OTHER PUBLICATIONS

Matei, Bogdan C.; Tan, Yi; Sawhney, Harpreet S.; Kumar, Rakesh "Rapid and scalable 3D object recognition using LIDAR data," Automatic Target Recognition XVI. Edited by Sadjadi, Firooz A.. Proceedings of the SPIE, vol. 6234, pp. 623401 (2006).

T. Yapo, C.V. Stewart, and R.J. Radke, A Probabilistic Representation of LiDAR Range Data tor Efficient 3D Object Detection. Proceedings of the S3D (Search in 3D) Workshop 2008, in conjunction with IEEE CVPR (2008).

G. Hetzel, B. Leibe, P. Levi, B. Schiele, "3D Object Recognition from Range Images using Local Feature Histograms", IEEE Conference on Computer Vision and Pattern Recognition (2001).

Yuri Owechko, Swarup Medasani, Thommen Korah, "Automatic Recognition of Diverse 3-D Objects and Analysis of Large Urban Scenes Using Ground and Aerial LIDAR Sensors", Conference on Lasers and Electro-Optics and The Quantum Electronics and Laser Science Conference, San Jose, CA (2010).

* cited by examiner

Behavior Distance

| | Drive-GetOff | | GetOn | | Trunk | | GetOn-Drive | | DropOff | |
|---|---|---|---|---|---|---|---|---|---|---|
| Drive-GetOff | 0 | 1.9719 | 3.8033 | 4.7618 | 3.6244 | 4.1926 | 3.1026 | 3.4495 | 2.4508 | 3.4222 |
| | 1.9719 | 0 | 4.6363 | 5.2784 | 4.1255 | 4.4868 | 3.6466 | 3.9661 | 3.8327 | 3.8567 |
| GetOn | 3.8033 | 4.6363 | 0 | 1.6697 | 2.7694 | 2.979 | 4.2122 | 2.982 | 1.795 | 2.0197 |
| | 4.7618 | 5.2784 | 1.6697 | 0 | 2.3256 | 2.8738 | 3.2344 | 1.3123 | 2.8397 | 2.0646 |
| Trunk | 3.6244 | 4.1255 | 2.7694 | 2.3256 | 0 | 0.6328 | 2.9303 | 3.6379 | 2.5276 | 2.2028 |
| | 4.1926 | 4.4868 | 2.979 | 2.8738 | 0.6328 | 0 | 3.0722 | 4.1211 | 3.3466 | 2.3395 |
| GetOn-Drive | 3.1026 | 3.6466 | 4.2122 | 3.2344 | 2.9303 | 3.0722 | 0 | 1.9221 | 4.3788 | 3.9388 |
| | 3.4495 | 3.9661 | 2.982 | 1.3123 | 3.6379 | 4.1211 | 1.9221 | 0 | 4.152 | 3.3769 |
| DropOff | 2.4508 | 3.8327 | 1.795 | 2.8397 | 2.5276 | 3.3466 | 4.3788 | 4.152 | 0 | 1.4895 |
| | 3.4222 | 3.8567 | 2.0197 | 2.0646 | 2.2028 | 2.3395 | 3.9388 | 3.3769 | 1.4895 | 0 |

Motion 3D Input

FIG. 15

THREE-DIMENSIONAL (3D) OBJECT DETECTION AND MULTI-AGENT BEHAVIOR RECOGNITION USING 3D MOTION DATA

CROSS-REFERENCE TO RELATED APPLICATIONS

This is a Continuation-in-Part application of U.S. application Ser. No. 12/644,349 filed on Dec. 22, 2009, entitled, "Strip Histogram Grid for Efficient Segmentation of 3D Pointclouds from Urban Environments". This is ALSO a non-provisional patent application of U.S. Provisional Application No. 61/501,589, filed on Jun. 27, 2011, entitled, "DTW-Based Behavior Analysis."

BACKGROUND OF INVENTION

(1) Field of Invention

The present invention relates to a motion recognition system, and more particularly, to a system that recognizes three-dimensional objects and behaviors based on three-dimensional motion data.

(2) Description of Related Art

Many surveillance or active safety applications require sensors for detecting objects and recognizing behaviors (e.g., non-safe actions) in various environments. In most cases, the sensors generate two-dimensional (2D) motion imagery in the visible and infrared (IR) bands. The availability of 3D sensors is increasing recently, but the algorithms handling the 3D data are hardly available and still at their emergent stages. For example, a need exists for automakers to use the 3D data to detect obstacles in motion imagery for control of autonomous vehicles and for active safety applications.

Most vision-based behavior recognition methods in surveillance, gaming or safety systems use 2D imaging sensors which lack 3D depth information. Current object detection and behavior recognition software does not approach human-level performance. For those surveillance and safety applications, the difficulties in detecting and recognizing safety-related events in motion imagery are rooted in the loss of information that occurs when 3D world information is projected into a 2D image.

Although object recognition for stationary objects has been accomplished using 3D Light Detection and Ranging (LIDAR) data, such success has not been equally applied to 3D motion data. Further, not many behavior recognition algorithms have developed for 3D motion data (if any, those that have been developed are for 3D data obtained from stereo imaging).

Thus, a continuing need exists for a system that makes use of full 3D motion data for object detection and behavior recognition, and that is capable of handling behaviors between multiple agents and/or objects.

SUMMARY OF INVENTION

The present invention relates to an object detection and behavior recognition system using three-dimensional motion data. The system receives three-dimensional (3D) motion data of a scene from at least one sensor, such as a LIDAR sensor. An object is identified in the 3D motion data. Thereafter, an object track is extracted, the object track being indicative of object motion in the scene over time. Through Dynamic Time Warping (DTW) or other comparison techniques, the object track is compared to a database to identify the behavior of the object based on its object track.

In another aspect, the system is configured to identify at least a second object in the 3D motion data. An object track is extracted of the second object, the object track being indicative of object motion in the scene over time. The object tracks of each of the first and the second objects are then normalized to generate first and second normalized object tracks. The first and second normalized object tracks can then be compared to calculate behavior differences and generate behavior results indicative of relative interactions between the first and second objects.

In another aspect, in normalizing the object tracks, each object track is transformed into an object-centered coordinate system. When the first object is a car, the object-centered coordinate system is a car-centric coordinate system, such that a center of a stopped car is the coordinate origin and a forward direction is aligned with a y-axis.

Additionally, the 3D motion data includes a series of input point clouds to form a 3D motion sequence.

In yet another aspect, the system generates a set of voxel for each of a baseline point cloud and an input point cloud, each voxel having cells such that each cell of the voxel contains a population count of 3D points within the cell. A ground plane map is then generated for the baseline point cloud. A two-dimensional (2D) projection map is then generated for each voxel, wherein each 2D projection map is comprised of grids with the 2D projection map being formed such that all cells of the voxel are projected along a z-axis so that each grid in the 2D projection map has an equal number of 3D points as the cells that correspond to the grid. Difference maps are then generated by comparing the 2D projection maps with a database of known objects and behaviors.

In yet another aspect, the system identifies, with a blob detector, a clustering of blobs as present in the difference maps. The blobs are then classified to identify the first object.

In recognizing a behavior of the first object based on the object track, dynamic time warping is used to find a mapping between features in the object track $a=\{a_1, \ldots, a_I\}$ and a second track $b=\{b_1, \ldots, b_J\}$, such that an average distance $d(a_i, b_j)$ between corresponding features $a_i$ and $b_j$ is minimized.

Further, each track is a sequence of pixel coordinate pairs, such that $d(a_i, b_j)$ are chosen to be the Euclidean distance between $a_i$ and $b_j$, with an optimal mapping being constrained so that endpoints match with $a_1$ corresponding to $b_1$, with $a_I$ corresponding to $b_J$.

In another aspect, optimal mapping is performed according to the following:

letting $a'=\{a_1, \ldots, a_{I-1}\}$ and $b'=\{b_1, \ldots, b_{J-1}\}$ be subtracks of a and h that contain all but their last features;

given optimal costs $C(a',b')$, $C(a',b)$ and $C(a,b')$, determining an optimal cost $C(a,b)$ between a and b as:

$$C(a,b)=\min\{C(a',b'),C(a',b),C(a,b')\}+d(a_i,b_j);$$

initializing a two-dimensional cost matrix $C[0 \ldots I, 0 \ldots J]$ is so that $C[0, 0]=0$, $C[1 \ldots I, 0]=\infty$, and $C[0, 1 \ldots J]=\infty$, with rows and columns of C being updated in order of increasing index, a best total cost $C(a,b)$ between tracks a and b is determined to be $C[I,J]$; and identifying an optimal mapping $\Phi$ between the two tracks by traversing backwards from $C[I,J]$ to $C[0, 0]$ to determine which sub-costs were chosen in the minimization.

Finally, as can be appreciated by one skilled in the art, the present invention also includes a method and computer program product. The method includes acts of causing a processor to perform the operations listed herein, while the computer program product comprises computer-readable instructions stored on a non-transitory computer-readable medium that are executable by a computer for causing the computer to perform the listed operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 15 is a confusion matrix of behavior matching.

DETAILED DESCRIPTION

Figure 1:
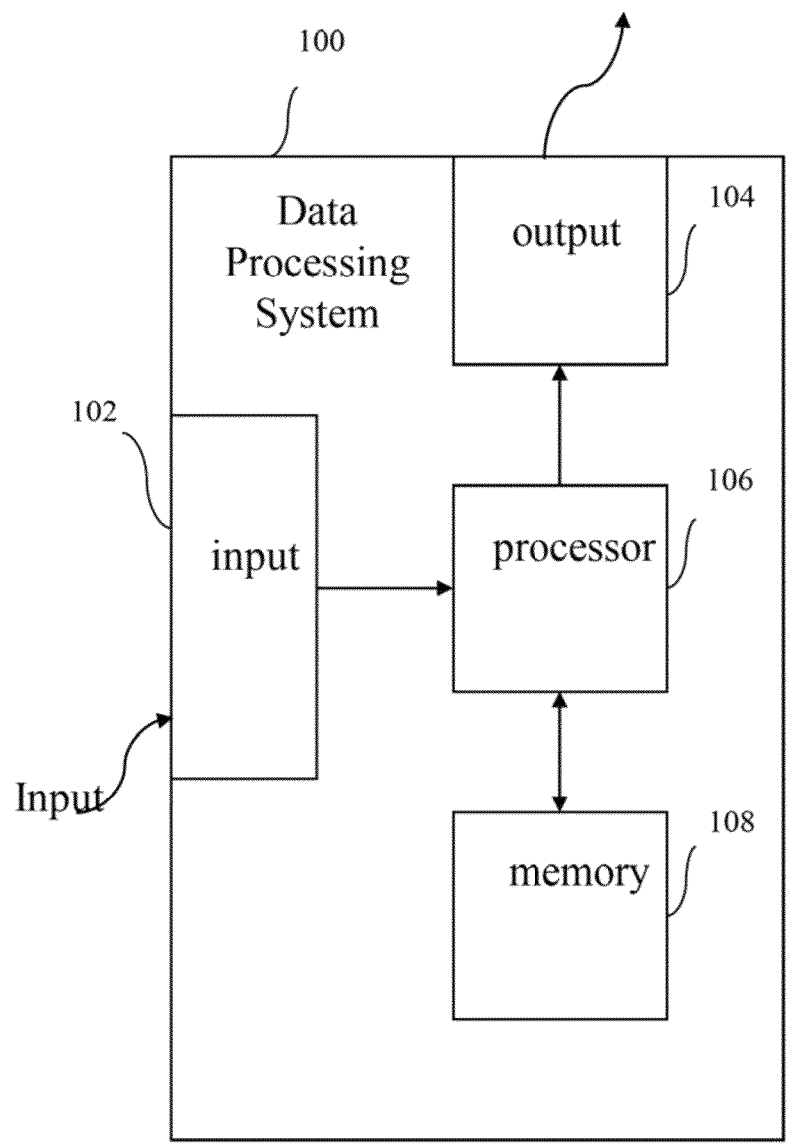
FIG. 1 is a block diagram depicting the components of a system of the present invention.

The present invention relates to a motion recognition system, and more particularly, to a system that recognizes three-dimensional (3D) objects and behaviors based on 3D motion data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of various principal aspects of the present invention is provided. Subsequently, an introduction provides the reader with a general understanding of the present invention. Finally, details of the present invention are provided to give an understanding of the specific aspects.

(1) Principal Aspects

The present invention has three "principal" aspects. The first is an object detection and behavior recognition system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of non-transitory computer-readable media include hard disks, read-only memory (ROM), and flash-type memories. These aspects will be described in more detail below.

A block diagram depicting the components of an object detection and behavior recognition system of the present invention is provided in FIG. 1. The system 100 comprises an input 102 for receiving information from at least one sensor for use in detecting an item in a scene. Note that the input 102 may include multiple "ports." Typically, input is received from at least one sensor, non-limiting examples of which include video image sensors. An output 104 is connected with the processor for providing information regarding the presence and/or identity and/or behavior of object(s) in the scene to other systems in order that a network of computer systems may serve as an object detection and behavior recognition system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
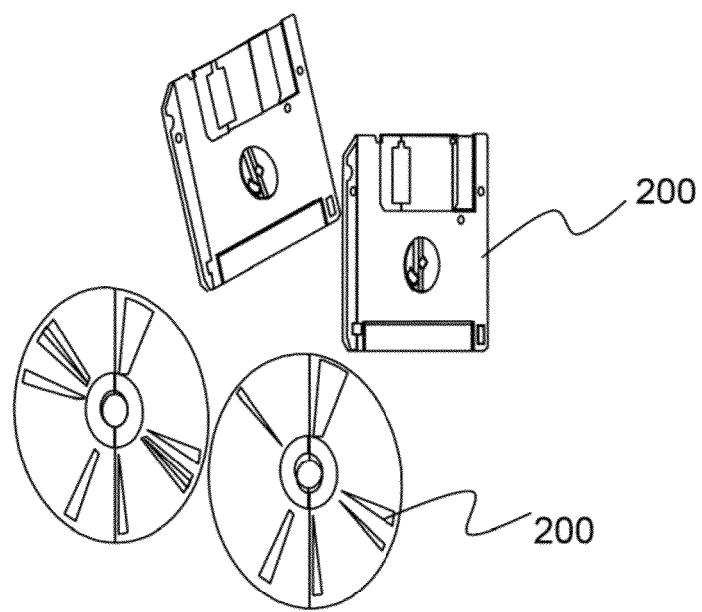
FIG. 2 is an illustration of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable "instructions" stored on any non-transitory compatible computer-readable medium. The term "instruction" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on any non-transitory computer-readable medium such as a floppy disk, a CD-ROM, and a flash drive.

(2) Introduction

Many surveillance and/or active safety applications require sensors for detecting objects and recognizing behaviors (e.g., non-safe actions) in various environments. In most cases, the sensors generate two-dimensional (2D) motion imagery in the visible and infrared (IR) bands. While three-dimensional (3D) sensors are increasingly available, algorithms handling the 3D data generated from such sensors are hardly available and still at their emergent stages.

The present invention improves on the state of the art by exploiting 3D motion data that is generated from the new 3D sensors. The 3D sensors generate 3D representations of a scene (also along with geo-coordinates if equipped with a GPS) at a real-time refresh rate, thereby avoiding the information loss inherent in 2D imaging. Thus, the present invention is directed to a unique system, method, and computer program product for 3D object detection and multi-agent (or multi-object) behavior recognition using 3D motion data. The 3D motion data is a sequence of 3D point clouds of a scene taken over time (similar to that of a video of 2D images in a 2D case). The 3D motion data can be collected from different sensors and techniques, such as flash Light Detection and Ranging (LIDAR), stereo cameras, time-of-flight cameras, or spatial phase imaging sensors. The present invention segments the 3D objects from a motion 3D sequence, where all the data are 3D points (x,y,z), to construct tracks of multiple objects or agents (i.e., person and vehicle) and then classifies the multi-agent tracks to one of a set of known behaviors, such as a behavior like "A person drives a car and gets out". A track is a sequence of an object's location changing over time and is the compact object-level information used and obtained from the 3D motion data. The present invention combines the behavior scores (or distances) from the multiple object-level tracks to recognize the interactive behaviors of those multiple agents.

The present invention can be applied to any surveillance/safety systems or product lines where object tracks or trajectories are extracted from 3D motion data and can be classified to behaviors. It should be understood that although the method is described below in the context of the car-person behavior application using LIDAR data, the invention not limited thereto as it can be applied to many other applications and other data captured by different types of 3D sensors as well. For example, this method can be used in collision avoidance, or in surveillance scenarios to detect suspicious or abnormal behaviors like shoplifting, loitering, fast-running, and meeting, which can reduce the workload of human security. It can also be applied to automatically monitor and track workers in a factory to provide safety warnings when dangerous activities are undertaken.

Figure 3:
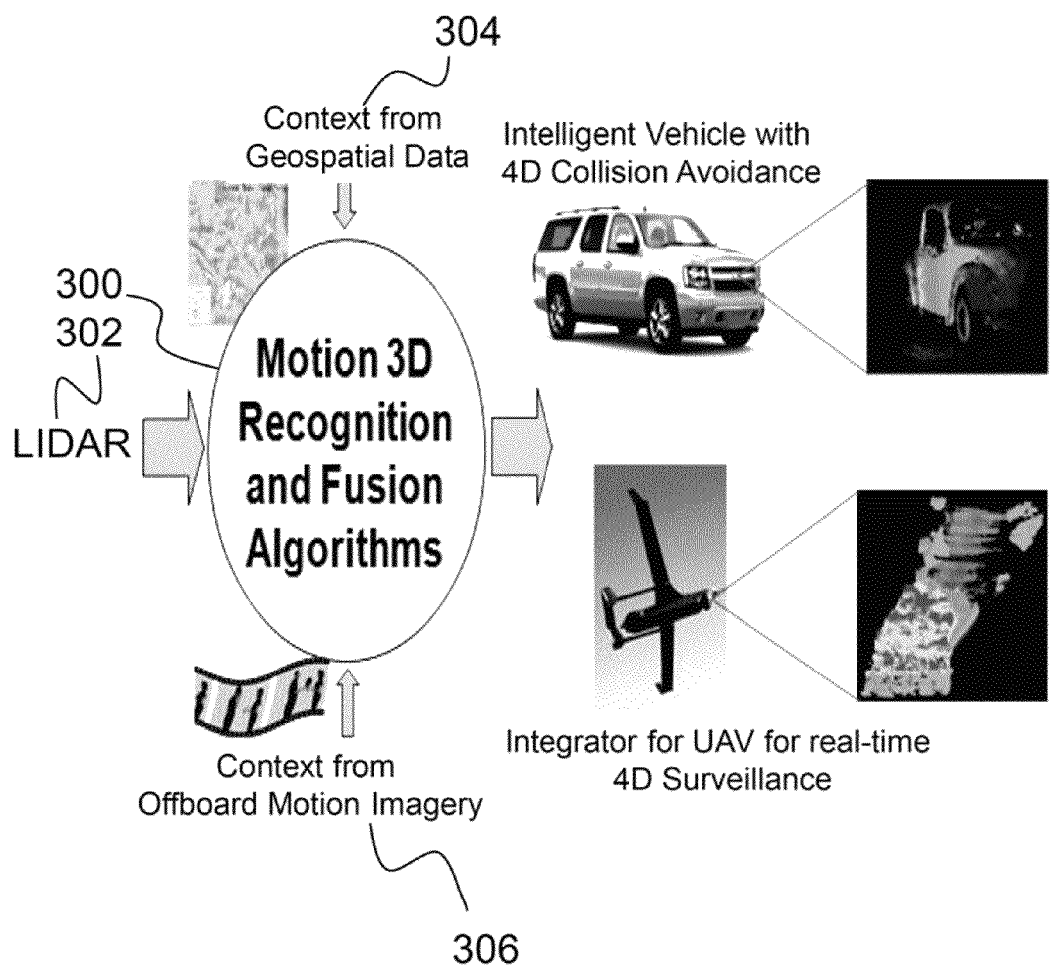
FIG. 3 is an illustration depicting potential applications of the present invention.

Another non-limiting example of a suitable application is the fusion of 3D motion data for real-time collision avoidance or surveillance operations (for air and ground vehicles). As shown in FIG. 3, fusion 300 of onboard 3D motion data 302 with map data 304 and off board sensors 306 provides real-time 3D scene analysis and situation awareness for air or ground platforms. It should be noted that the fusion of 3D data with time allows for 4D collision avoidance or 4D surveillance operations.

As can be appreciated by one skilled in the art and given the examples above, there are numerous modes by which the present invention can be employed to provide 3D object detection and multi-agent behavior recognition using 3D motion data. Specific details of the invention are provided below.

(3) Details of the Invention

As noted above, the present invention is directed to a unique system for 3D object detection using 3D motion data and multi-agent behavior recognition. The 3D motion detection and behavior recognition techniques are presented in the following subsections.

(3.1) 3D Motion Detection

To initiate the process, the system must first collect 3D motion data. The 3D motion data can be collected using any suitable 3D scanner system. As a non-limiting example, a Riegl Light Detection and Ranging (LIDAR) scanner can be used. The Riegl LIDAR scanner is produced by Riegl USA, located at 7035 Grand National Drive, Suite 100, Orlando, Fla. 32819. LIDAR is an optical remote sensing technology that measures properties of scattered light to find range and/or other information of a distant target. For example, the LIDAR scanner can capture a 3D snapshot (point cloud) and concatenated shots taken consecutively over time to form a 3D motion sequence.

Figure 4:
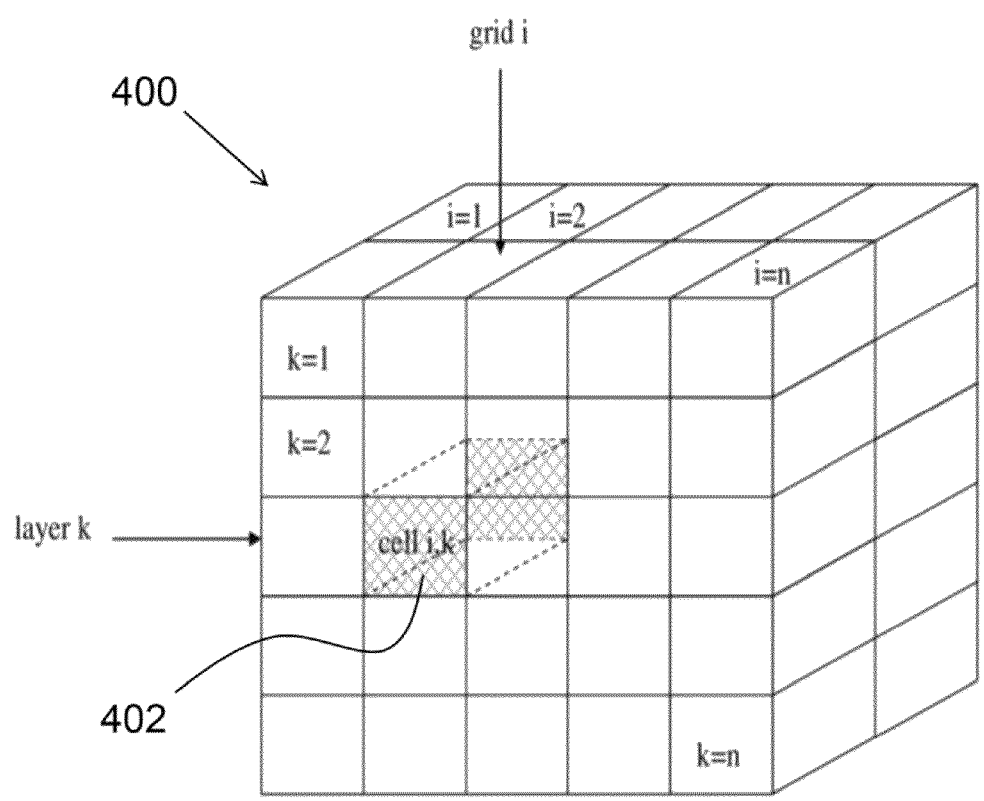
FIG. 4 is an illustration of a voxel, depicting the three-dimensional (3D) points as being divided by layer and grid lines, with each cell of the voxel having its count of 3D points included.

Collected LIDAR point clouds from the 3D scanner first undergo a data preparation process that involves format conversion and point cloud editing. Once the data is properly prepared, it is fed to a 3D motion detection algorithm for processing. As shown in FIG. 4, the processing starts by computing a set of voxel 400 for each of a baseline (background) point cloud and an input point cloud (as captured from the 3D scanner). Each cell 402 of the voxel 400 contains a population count of points within the cell 402.

A ground plane map is computed for the baseline point cloud to deal with elevation. The ground plane map is calculated by counting the number of 3D points in each grid for the baseline point cloud which does not include any foreground objects. Using this ground plane map of the background, the foreground objects can be obtained by background subtraction.

The process is followed by a difference map computation where the two voxels are compared to detect cars and persons. In order to generate the difference map, 3D voxels are first projected onto a 2D projection map (as shown in FIGS. 5A through 6B).

Figure 5A:
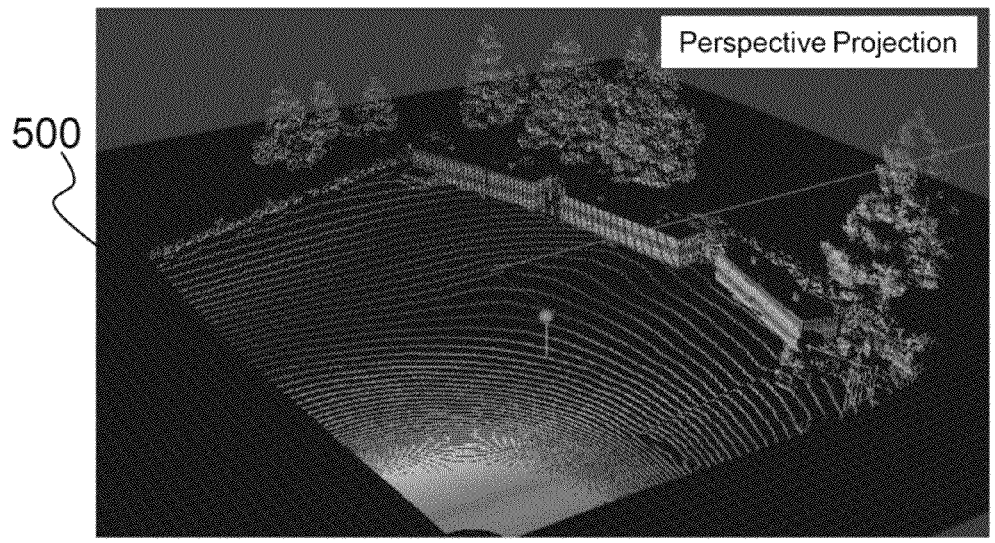
FIG. 5A is an illustration of a baseline (background) point cloud.
Figure 5B:
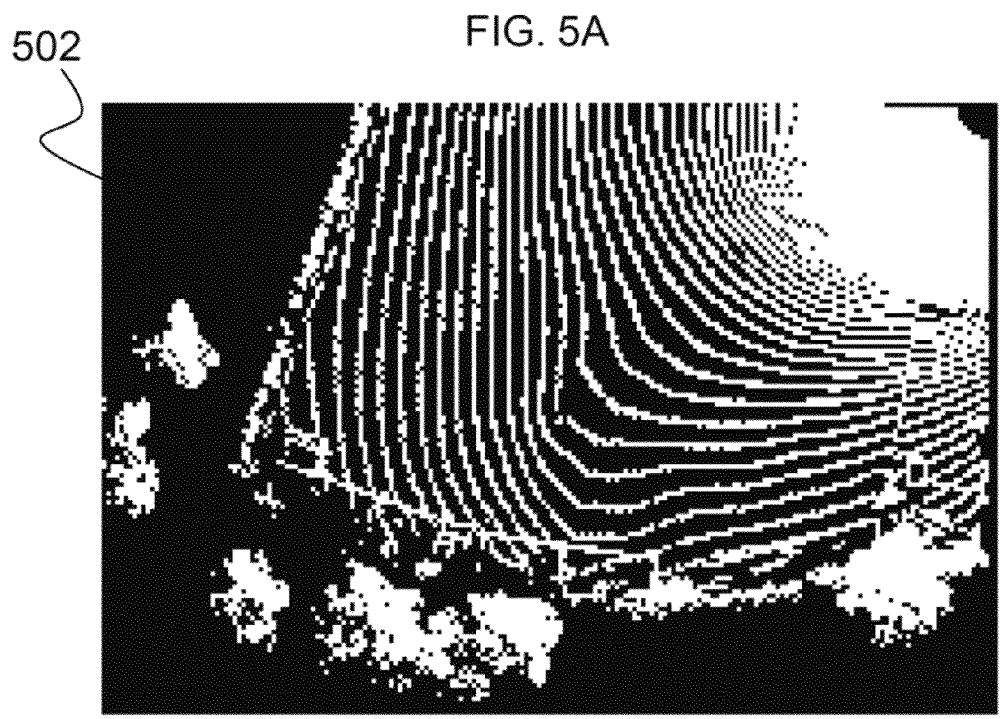
FIG. 5B is an illustration of the 2D projection resulting from the point cloud depicted in FIG. 5A.
Figure 6A:
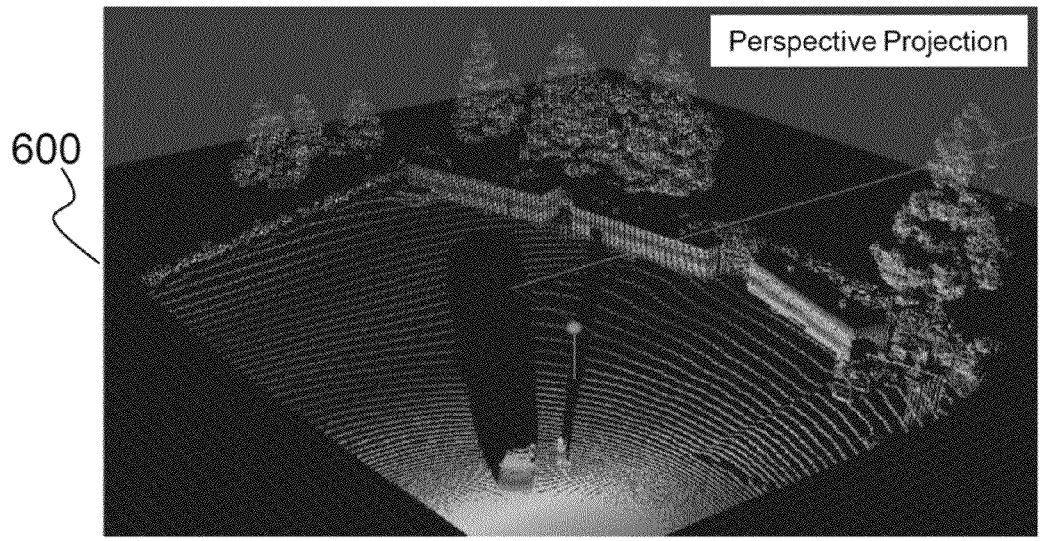
FIG. 6A is an illustration of an input point cloud.
Figure 6B:
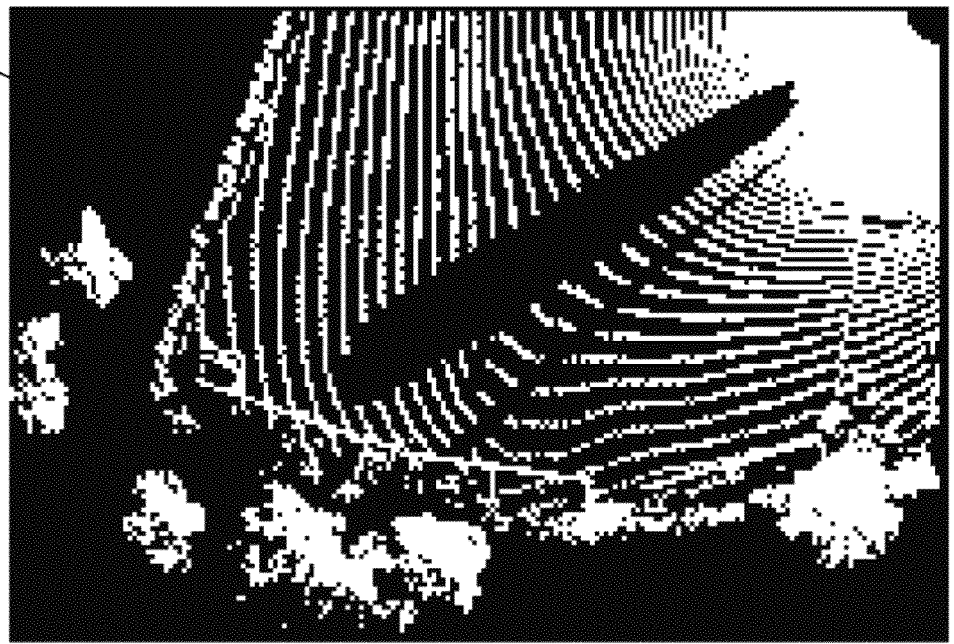
FIG. 6B is an illustration of the 2D projection resulting from the point cloud depicted in FIG. 6A.

Specifically, FIG. 5A is an illustration of a baseline (background) point cloud 500, while FIG. 5B is an illustration of the 2D projection map 502 of the point cloud 500 depicted in FIG. 5A. Alternatively, FIG. 6A is an illustration of an input point cloud 600, while FIG. 6B is an illustration of the 2D projection map 602 of the input point cloud 600. In generating the projection maps, all the cells of the voxels are projected along the z-axis so that the each grid in the 2D projection map has the number of 3D points within the cells belonging to the grid.

Figure 7A:
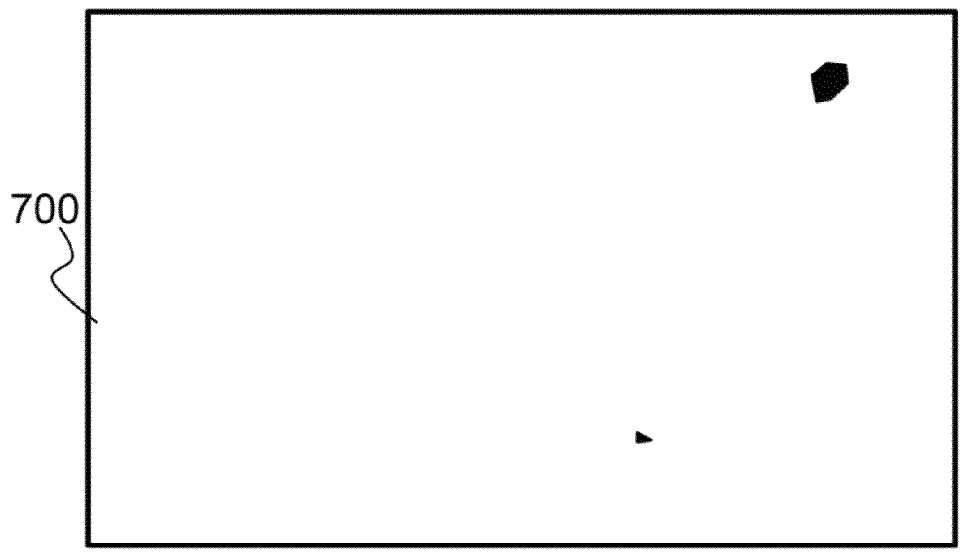
FIG. 7A is a difference map for a vehicle as generated through 213 project map differencing.
Figure 7B:
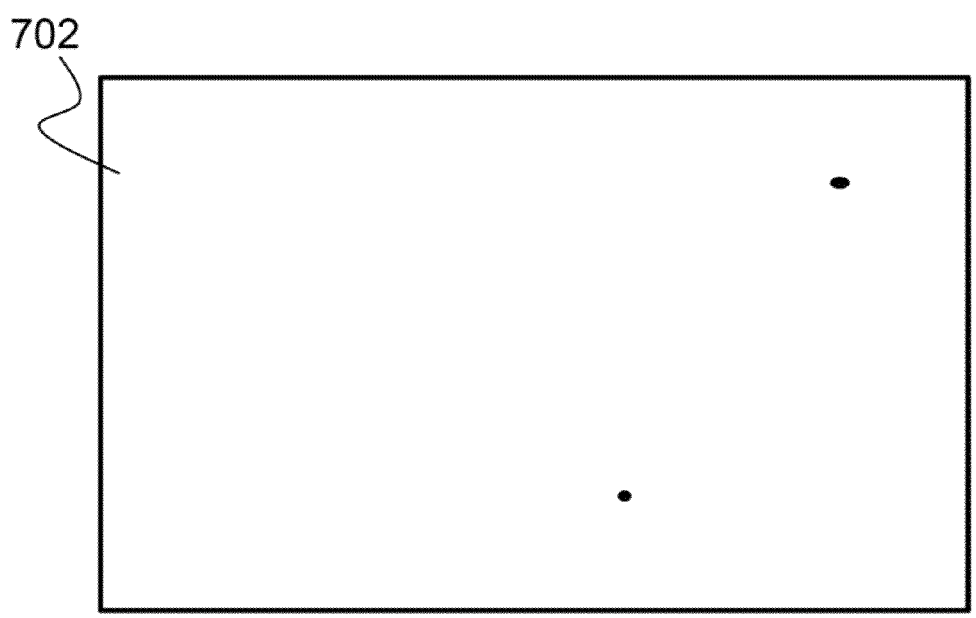
FIG. 7B is a difference map for a pedestrian as generated through 2D project map differencing.

The 2D projections are then used for the difference map computation. The difference map computation is a comparison between the projection maps to identify objects and their behaviors. This is accomplished through using the baseline data to identify known objects and the 3D motion data to identify the behaviors. In the case of cars and pedestrians and as shown in FIGS. 7A and 7B, the result of 2D project map differencing is one vehicle difference map 700 for vehicles and one pedestrian difference map 702 for pedestrians.

The vehicle difference map 700 identifies differences in the baseline and input voxel from the ground to the average vehicle (e.g., car) height. The pedestrian difference map 702 identifies a similar vertical density of points from the ground to the average height of a person. The baseline map is a 2D projection of the baseline (background) point cloud along the z-axis. The baseline map is compared with the projection map generated from the input point cloud which may include some objects of interest. Subtraction of the baseline map from the input project maps results in the difference map. The vertical density of points from the ground to the average height of each object type (vehicles and pedestrians in our case) is used to generate the object-specific difference map, i.e., vehicle difference map and pedestrian difference map.

The difference maps are then passed to a blob detector (back to the 3D space) that is used to identify clustering of points or "blobs" in the difference maps. A typical blob detector uses connect component analysis to merge spatially connected pixels and labels them into multiple blobs.

Figure 8A:
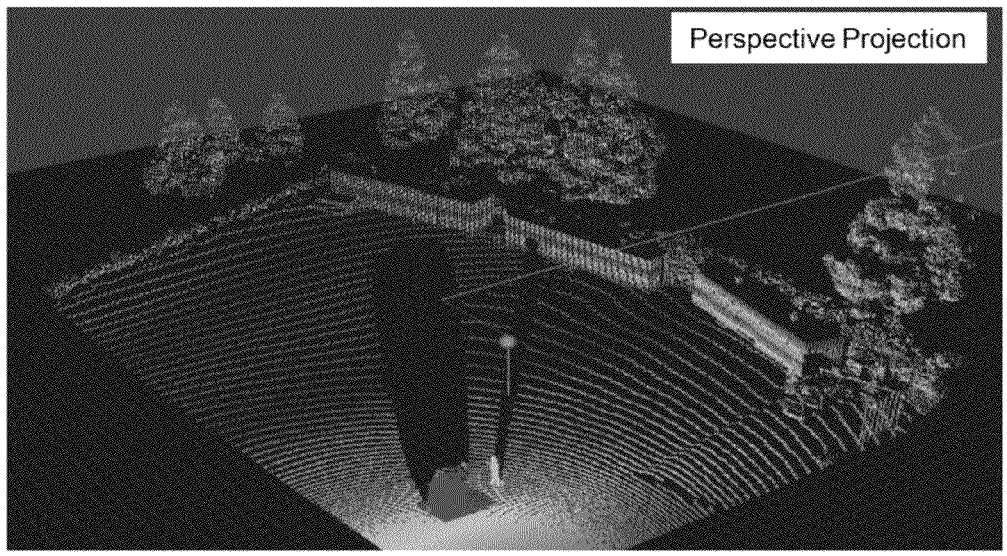
FIG. 8A is an illustration depicting an object detection of a vehicle as red and a pedestrian as blue.
Figure 8B:
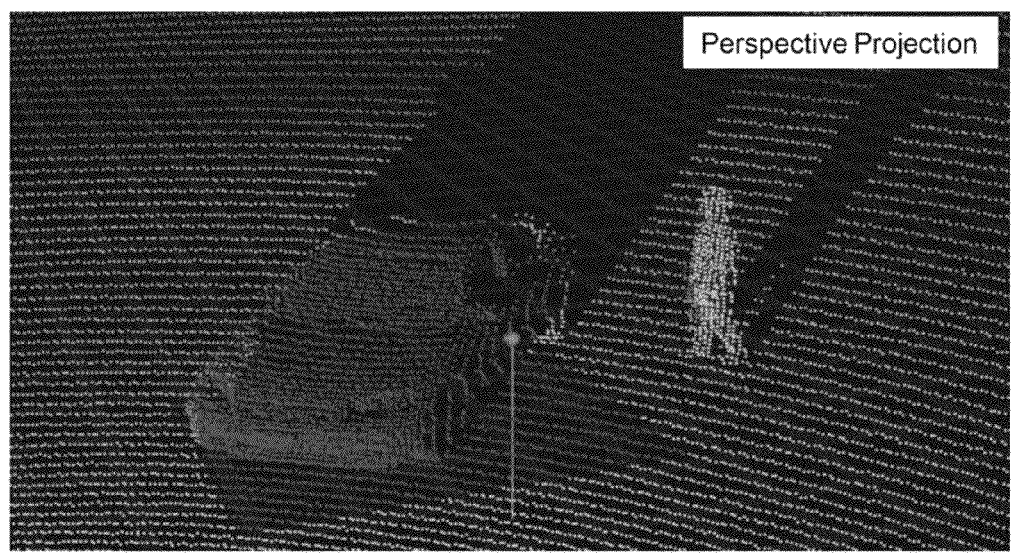
FIG. 8B is a close-up view of the illustration depicted in FIG. 8A, further illustrating the object detection of the vehicle and pedestrian.

The returning blobs are filtered and then classified as the applicable object of interest, as shown in FIGS. 8A and 8B. FIG. 8A is an illustration depicting an object detection of a vehicle as red and a pedestrian as blue, while FIG. 8B is a close-up view of the illustration depicted in FIG. 8A, further illustrating the object detection of the vehicle and pedestrian.

Classification of the blobs can be accomplished using any suitable 3D classification technique. For example, for 3D object recognition, the blob detection can be used to extract point cloud objects and compute a feature vector which is then fed to a classifier. Such an approach was described by Yuri Owechko, Swarup Medasani, and Thommen Korah, in "Automatic Recognition of Diverse 3-D Objects and Analysis of Large Urban Scenes Using Ground and Aerial LIDAR Sensors", at the Conference on Lasers and Electro-Optics and The Quantum Electronics and Laser Science Conference, San Jose, Calif. (2010), which is incorporated by reference as though fully set forth herein. This classifier approach allows the system to detect a greater variety of car, person (or pedestrian), and situation more robustly.

(3.2) 3D Motion Behavior Recognition

The behavior recognition system involves multiple objects or agents and their interaction. The system first generates object tracks from the blobs as detected over time in the previous detection stage. A track is a sequence of object location changing over time and is the compact object-level information that is used and obtained from the 3D motion data.

Figure 9:
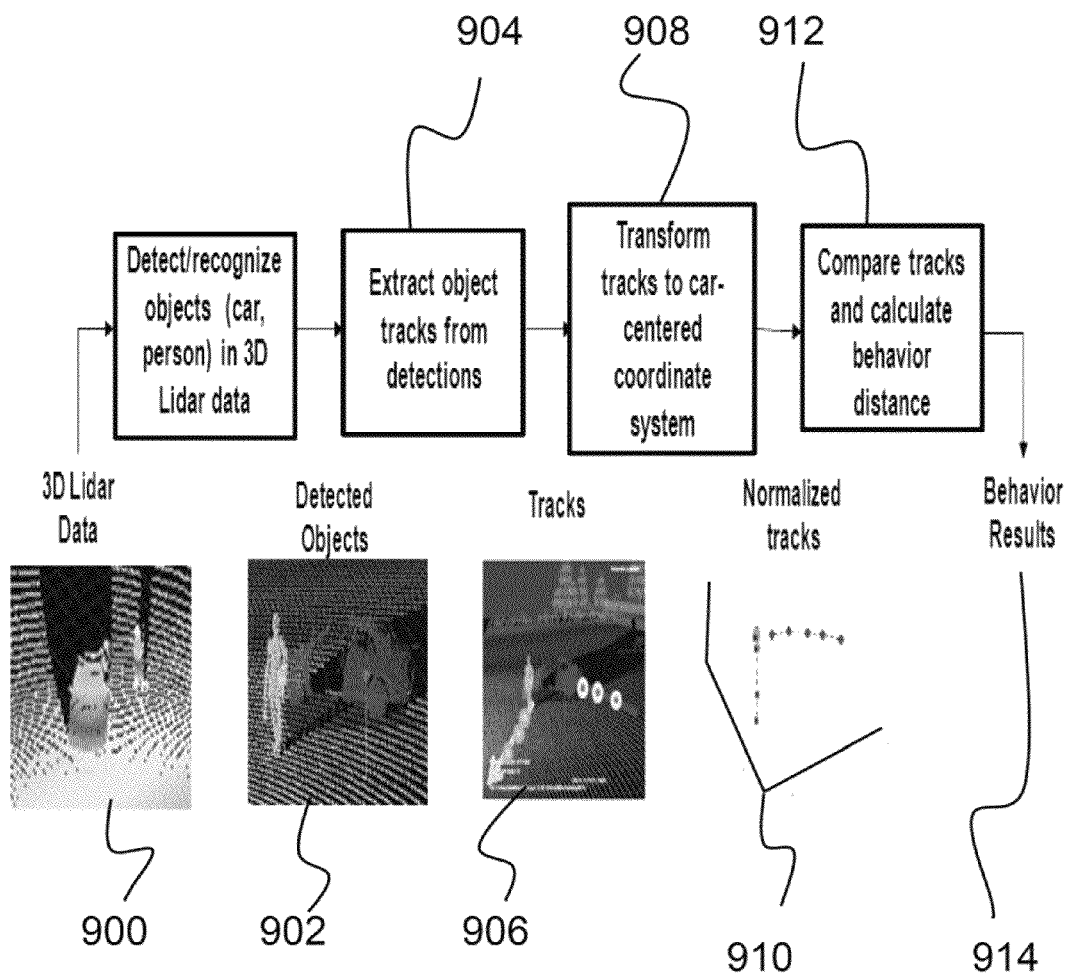
FIG. 9 is a block diagram illustrating object detection and behavior recognition using 3D motion data.

A block diagram illustrating multi-agent behavior recognition is illustrated in FIG. 9. As noted above, 3D LIDAR data 900 is received into the system, which according to the process above, results in object detection 902. Once the objects are detected and/or classified, the system extracts object tracks 904 from the detections. This is illustrated as a track image 906 showing the object motion tracks of each object over time.

The tracks are extracted by associating the detected objects frame-to-frame based on the object type and proximity. There are also a few advanced tracking methods that can be applied to the present invention, such as Kalman filtering and particle filtering, which use the object dynamics and feature likelihood for better tracking quality.

After the tracks are extracted, they are transformed to an object-centered coordinate system 908, resulting in normalized tracks 910. The tracks are transformed into the normalized tracks 910 using any suitable technique. As a non-limiting example, the tracks are transformed into the normalized tracks by moving the object center (the coordinate of the stopped vehicle) to the origin [0,0] and rotating around this new origin so that the track points are aligned for DTW analysis.

Figure 10:
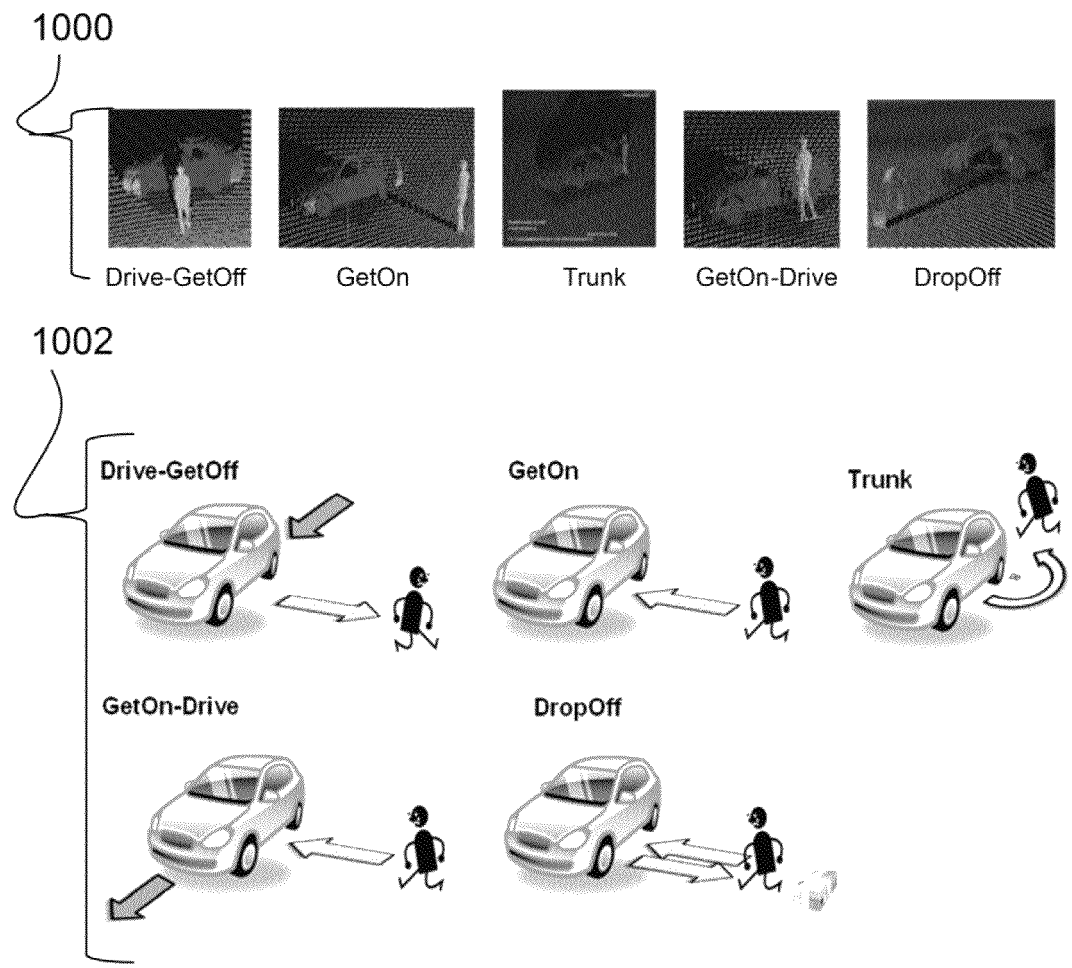
FIG. 10 is an illustration depicting five different behaviors in 3D motion data.

The normalized tracks 910 are then compared 912 to calculate behavior distances and generate behavior results 914 (i.e., behavior recognition). One can use a behavior score or a behavior distance for recognition/matching depending on the metric used. As a non-limiting example, 'distance' can be used, which quantifies how much a behavior differs from another. A person behavior distance and a car behavior distance are combined with the weight of a portion (e.g., 50%) of each to get the final behavior distance. Depending on the 3D sensor's location, the absolute 3D coordinates of the object tracks could be different even for the same behaviors. In a car-person behavior recognition problem, all the tracks are normalized to the car-centric coordinate system, where the center of the stopped car is the coordinate origin and the forward direction is aligned with the y-axis, in order to avoid confusion and to make unique track data for the same behaviors. For example, FIG. 10 illustrates a series of behaviors with respect to a person and corresponding vehicle. More specifically, FIG. 10 illustrates the 3D motion dataset 1000 for five different car-person behaviors 1002 that were collected for testing. For example, the behaviors are Drive-Get-Off (where a person (i.e., driver) drives a car and then exits the car); GetOn (where a person gets into a car); Trunk (where a person walks around to the trunk of a car); GetOn-Drive (wherein a person enters a car and then drives the car); and DropOff (where a person exits a car and then returns to the car).

Although the behaviors as illustrated in FIG. 10 are typical interaction behaviors happening between a driver and a car, as can be understood by one skilled in the art, the present invention can be applied to any other situations and scenarios, such as a person loitering around a car, a person shoplifting in a store, a car doing a U-turn illegally, etc.

Figure 11:
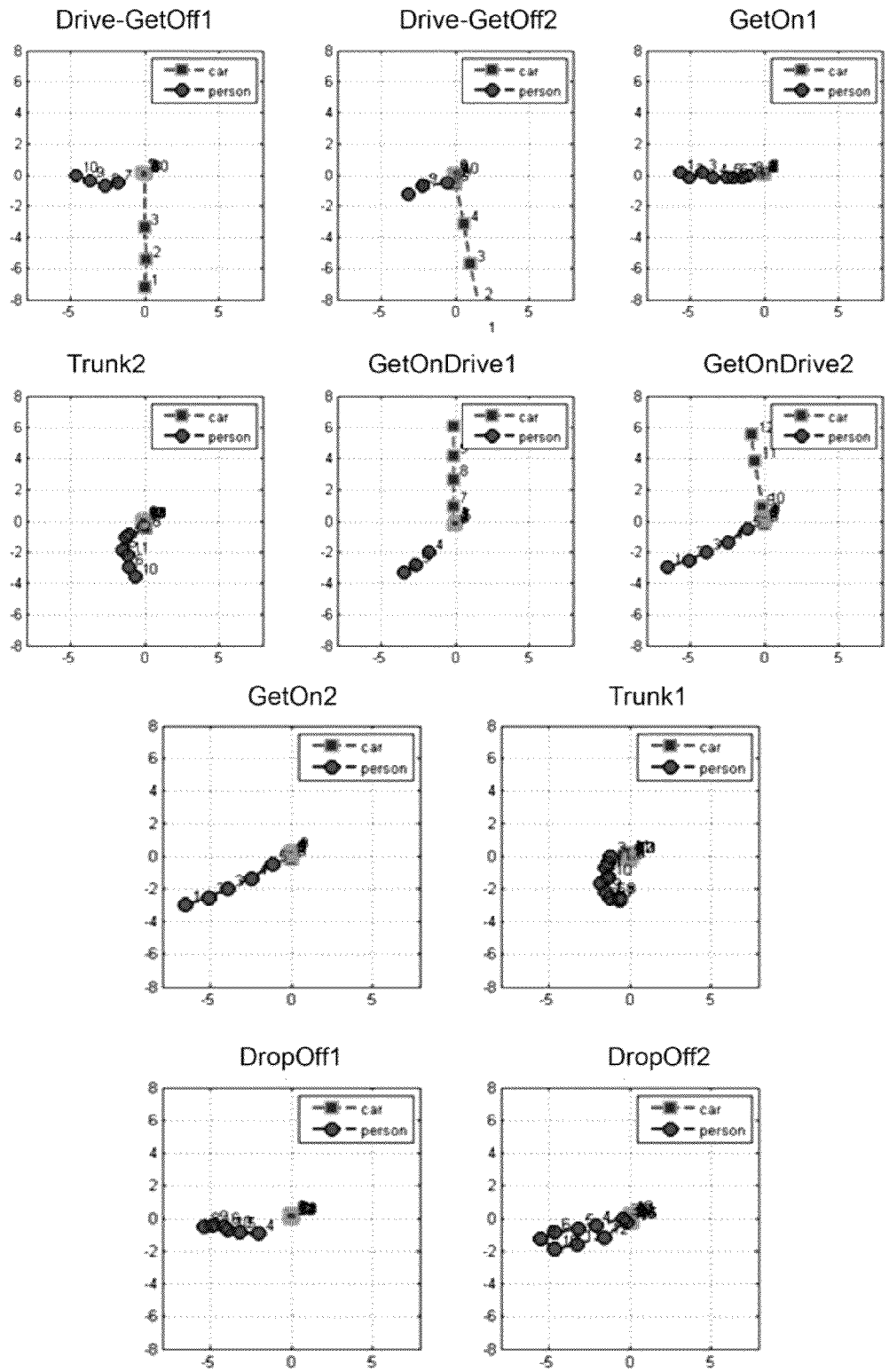
FIG. 11 is collection of plot graphs depicting normalized tracks in a car-centric coordinate system for behavior analysis, illustrating green squares as a vehicle and red circles as a pedestrian.

The normalized tracks of the behaviors illustrated in FIG. 10 are shown in FIG. 11. It should be noted that in testing, two samples were collected for each behavior, resulting in ten normalized tracks (as depicted in FIG. 11) for the five behaviors illustrated in FIG. 10.

As another example of behavior recognition, given a pair of tracks, Dynamic Time Warping (DTW) can be used to compare the tracks to classify the tracks to one of a set of known behaviors or as either normal or anomalous. To classify a given query track, a "distance" is measured between the query track and all tracks in a database. It is difficult to determine a meaningful distance between pairs of tracks because tracks can have great variability. Even tracks of the same behavior can have different lengths and velocities due to variations in the way people walk or the speed at which vehicles move. DTW serves as a distance metric and allows for a meaningfully comparison of behavior tracks while elegantly dealing with temporal variations in behaviors. After applying DTW, spatial behaviors can be compared easily in a simple nearest-neighbor framework.

The present invention improves upon and adapts the well known DTW algorithm of Sakoe and Chiba to the visual tracking domain. The algorithm of Sakoe and Chiba is described in "Dynamic programming algorithm optimization for spoken word recognition," IEEE Trans. On Accoustics, Speech, and Signal Proc., 26(1):43-49, February 1978, which is incorporated by reference as though fully set forth herein.

The DTW-based method for behavior recognition according to the present invention is nonparametric and data-driven. It only assumes that tracks of the same type of behavior tend to cluster after temporal variations are removed. Because classification is based on distance to tracks in a database, no heuristic training process is required.

For further understanding, DTW as adapted to the present invention is described below by illustrating its use for anomalous behavior detection.

Figure 12:
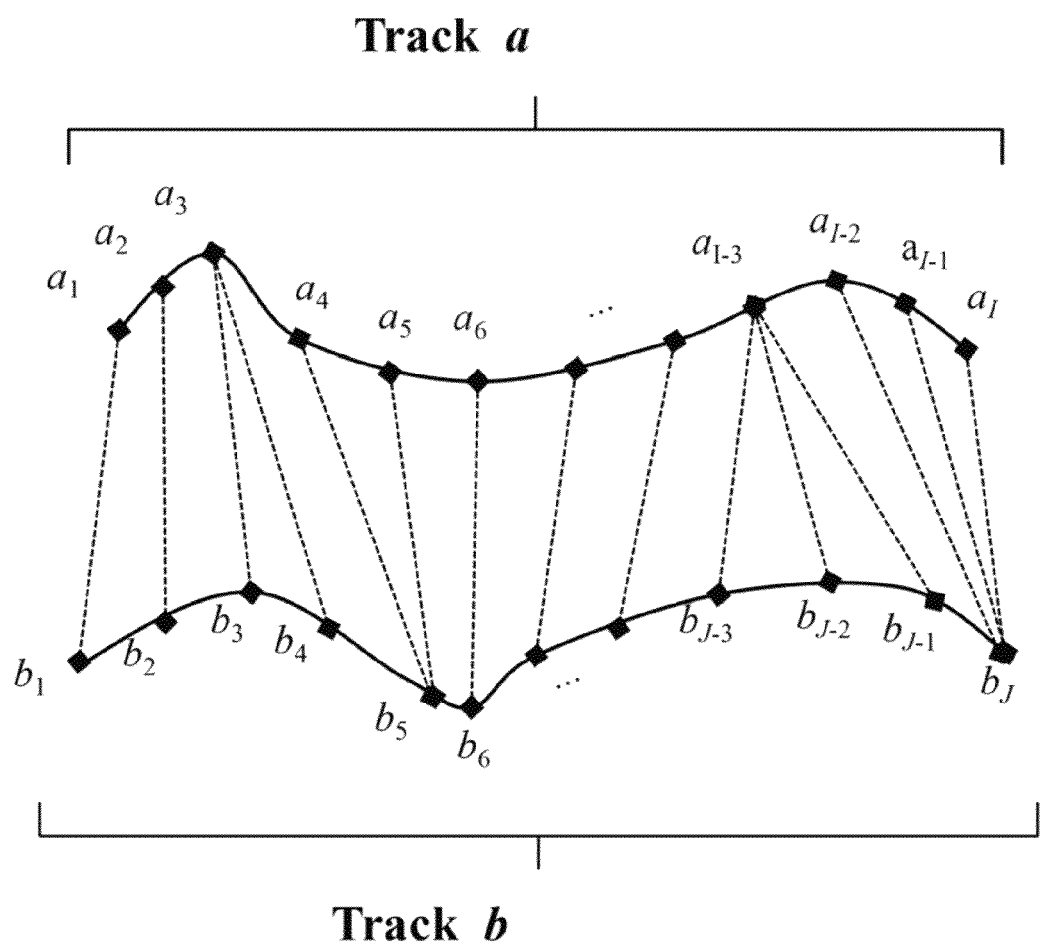
FIG. 12 is an illustration depicting an example of a time warping between tracks a and h, with corresponding features between the tracks being indicated by dashed-lines.

Given a pair of tracks $a=\{a_1, \ldots, a_I\}$ and $b=\{b_1, \ldots, b_J\}$; DTW finds a mapping between features in a and b, such that the average distance $d(a_i, b_j)$ between corresponding features $a_i$ and $b_j$ is minimized. FIG. 12 shows an example of warping between two tracks (a and b), with corresponding features between the tracks being indicated by dashed lines. Each track is a sequence of pixel coordinate pairs, and so in this context, $d(a_i, b_j)$ are chosen to be the Euclidean distance between $a_i$ and $b_j$. For other applications or in other embodiments, portions of a track may already be annotated with semantic labels that can be used to augment and improve the distance metric between features. The optimal mapping is constrained so the endpoints match (i.e., $a_1$ corresponds to $b_1$, $a_I$ corresponds to $b_J$) and no reversals of time are allowed.

Let $a'=\{a_1, \ldots, a_{I-1}\}$ and $b'=\{b_1, \ldots, b_{J-1}\}$ be subtracks of a and b that contain all but their last features. The key insight in DTW is that, given the optimal costs C(a',b'), C(a',b) and C(a,b'), the optimal cost C(a,b) between a and b is:

$$C(a,b) = \min\{C(a',b'), C(a',b), C(a,b')\} + d(a_i,b_j).$$

This insight allows for C(a,b) to be efficiently computed using a process known as Dynamic Programming. In this process, a two-dimensional cost matrix C[0 . . . I, 0 . . . J] is initialized so that C[0, 0]=0, C[1 . . . I, 0]=∞, and C[0, 1 . . . J]=∞. Then, the rows and columns of C are updated in order of increasing index, using the above equation. The best total cost C(a,b) between tracks a and b is C[I,J]. The optimal mapping Φ between the two tracks is found by traversing backwards from C[I,J] to C[0, 0], determining which sub-costs were chosen in the minimization. The distance between behaviors C*(a,b) is the average pixel distance after applying DTW:

$$C^*(a,b) \triangleq \frac{1}{I} C(a,b) = \frac{1}{I} \sum_{i=1}^{I} d(a_i, b_{\Phi(i)}).$$

Figure 13:
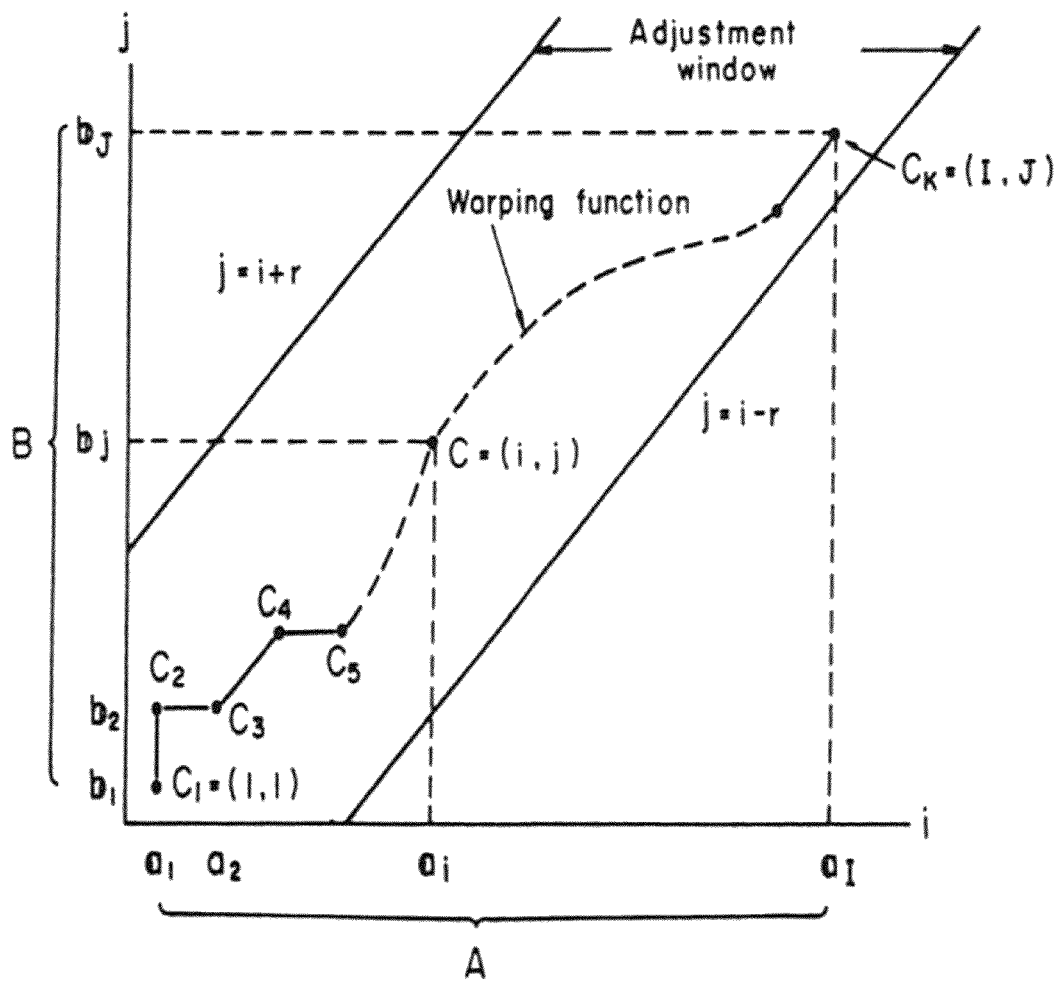
FIG. 13 is a data matrix used by dynamic programming to find the best time warping between tracks a and b, which, given optimal cost $C_K=C[I,J]$, allows for recovery of the optimal mapping $\Phi$ between a and b by tracing backwards through this matrix.

During the dynamic programming process, one can constrain the warping to disallow very large warpings using an adjustment window (as shown in FIG. 13). FIG. 13 is a data matrix used by dynamic programming to find the best time warping between tracks a and b. Given optimal cost $C_K$=C[I, J], the optimal mapping Φ can be recovered between a and b by tracing backwards through this matrix. In addition, the classification of behaviors can be made more robust to outliers in the database by using the k-nearest distance C*(a,b).

Figure 14A:
FIG. 14A is an illustration of a scene, depicting a query track being matched via Dynamic Time Warping (DTW) with the closest track in a database B to detect a normal behavior.
Figure 14B:
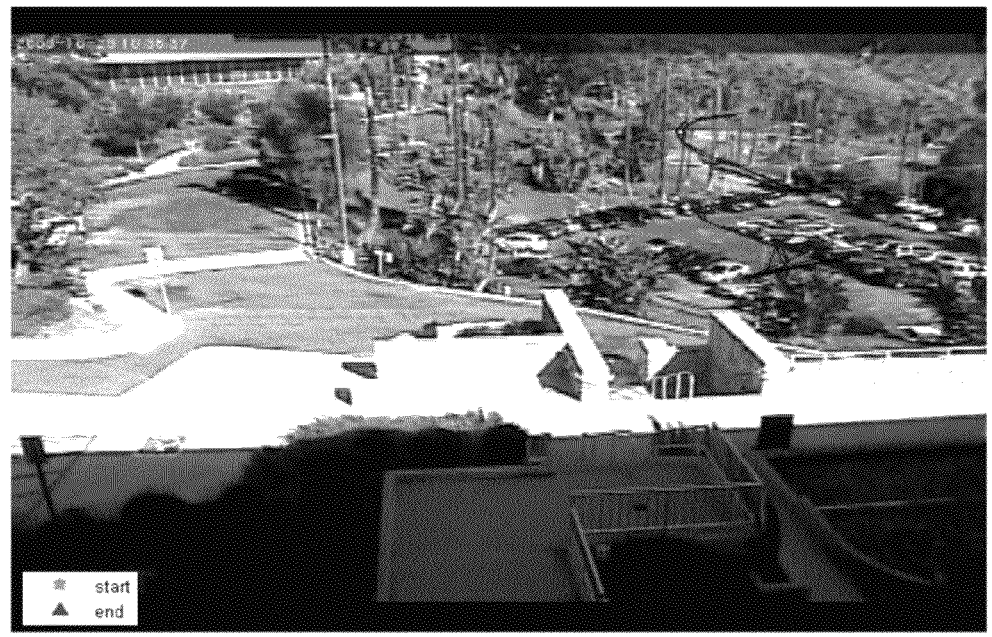
FIG. 14B is an illustration of a scene, depicting a query track being matched via Dynamic Time Warping (DTW) with the closest track in a database B to detect a normal behavior.
Figure 14C:
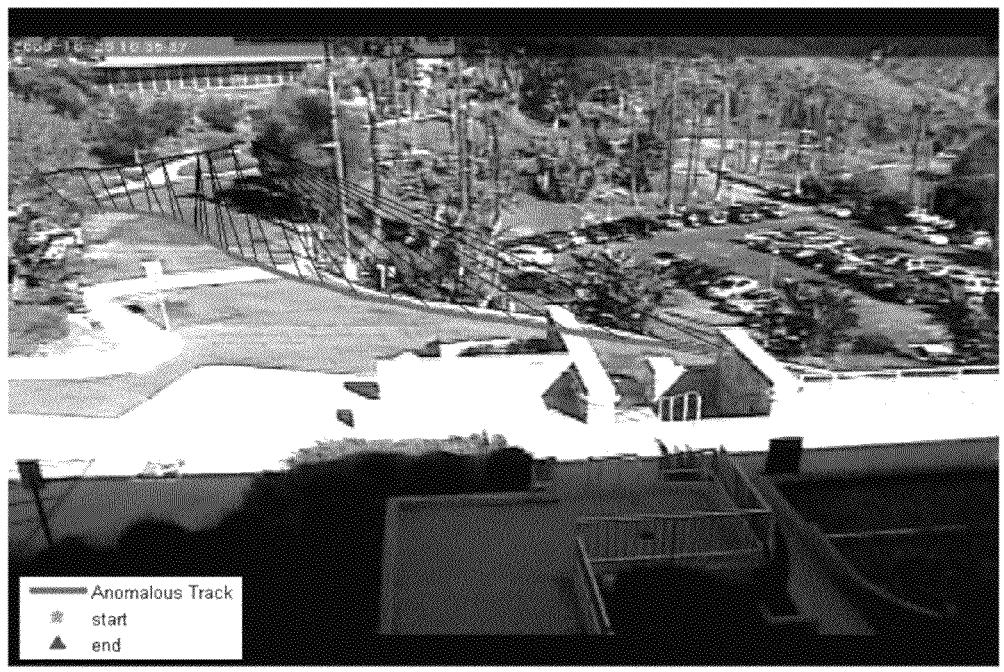
FIG. 14C is an illustration of a scene, depicting a query track being matched via Dynamic Time Warping (DTW) with the closest track in a database B to detect a abnormal behavior.
Figure 14D:
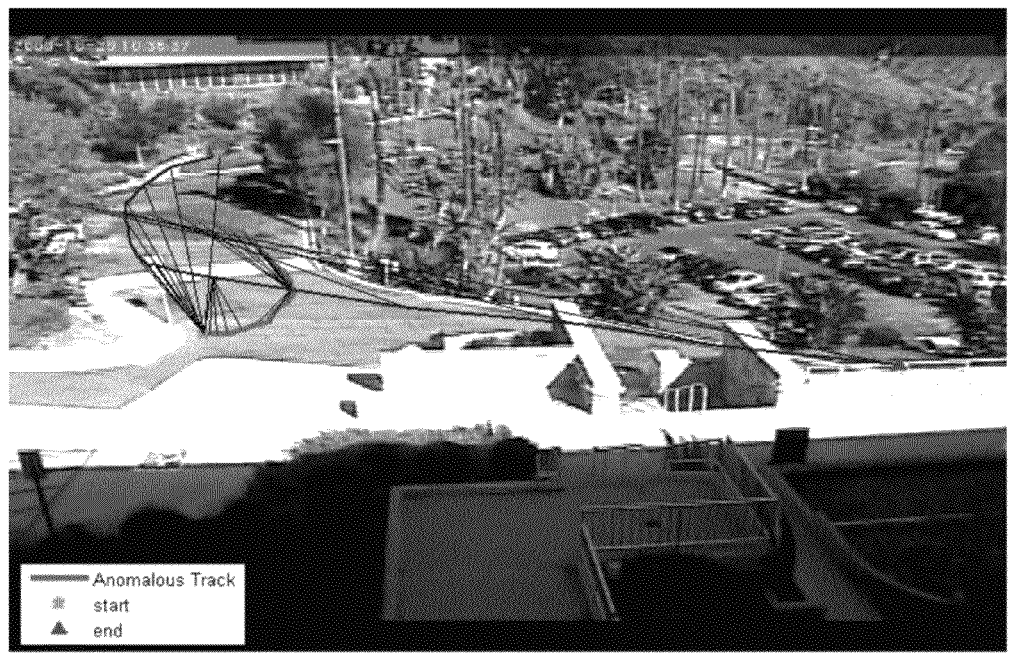
FIG. 14D is an illustration of a scene, depicting a query track being matched via Dynamic Time Warping (DTW) with the closest track in a database B to detect a abnormal behavior.

An example of DTW matching is depicted in FIGS. 14A through 14D, which illustrate images of query tracks being matched via DTW with the closest track in a database B. More specifically, FIGS. 14A and 14B are photographs of a scene with the two tracks, depicting detection of normal behaviors based on DTW matching scores of C*=13.76 and C*=18.13, respectively. Alternatively, FIGS. 14C and 14D are photographs of a scene with the two tracks, depicting detection of abnormal behaviors based on DTW matching scores of C*=120.52 and C*=56.58, respectively.

In these examples, data was collected and tracked of 34 normal vehicle behaviors (e.g., cars entering parking lot) from one 60 minute video sequence, as well as 9 anomalous vehicle behaviors (e.g., cars going the wrong way on a one-way road) from one 30 minute video sequence. Each anomalous behavior was compared to all behaviors in the database using the DTW-based distance measure C*, and similarly, each normal behavior was compared to all other behaviors in the database using C*. A given behavior a was deemed normal if $\min_{b \in B} C^*(a,b) < \tau$, where τ is a user-defined threshold, and deemed anomalous otherwise. For τ=25, all vehicle behaviors were classified correctly.

(4) Test Results

To confirm functionality, the present invention was evaluated using the five behaviors (two instances each, ten in total) as depicted in FIGS. 10 and 11. Finally, FIG. 15 provides the confusion matrix of the pair-wise behavior distances (d=d_car+d_person), with d_car and d_person defined as follows:
 a. Behavior distance metric: d=d_car+d_person
 b. d_car (car behavior norm distance, 50% weight): check if car motions are different. The difference between the motion variances is used.
 c. d_person (person behavior norm distance, 50% weight): DTW (dynamic time warping) distance of person tracks in the car-centric normalized coordinate system as shown in FIG. 11.

In the matrix, lower distances mean better matching. In this case, the multi-agent behavior recognition method used in 3D motion data successfully recognized 5 different car-related behaviors with a Probability of Detection (Pdet) equal to 90% and a Probability of False Alarm (Pfa) equal to 2.5%. It should be noted that a circle is provided in the confusion matrix of FIG. 15. The circle is used to highlight the single instance among the 10 tested examples where the minimum behavior distance did not classify the 3D Motion input to the correct behavior.

(5) Summary

The present invention is directed to 3D object detection and multi-agent behavior recognition system using 3D motion data. The present invention improves upon the prior art through a combination of segmentation and recognition of multiple objects from 3D motion data. In doing so, moving objects are detected by subtracting the baseline (background) point cloud from an input point cloud in the 2D projection space. The object classifier classifies detected 3D blobs into multiple classes (e.g., person, vehicle, or others).

The system also normalizes multi-agent tracks to assess relative interactions. Depending on the 3D sensor's location, the absolute 3D coordinates of the object tracks could be different even for the same behaviors. In the car-person behavior recognition problem, all the tracks are normalized to the car-centric coordinate system, where the center of the stopped car is the coordinate origin and the forward direction is aligned with the y-axis (in order to avoid confusion and to make unique track data for the same behaviors).

Finally, the system also combines behavior scores for complex behavior recognition. Each object (agent) is compared separately for its behavior score (or distance) and then combined into a final score for multi-agent behavior recognition. Thus, through using 3D motion data, dynamic time warping of tracks, and a combination of behavior scores, the system effectively recognizes objects and behaviors from 3D motion data.

What is claimed is:

1. An object detection and behavior recognition system using three-dimensional motion data, comprising one or more processors and a memory, the memory having executable instructions encoded thereon such that upon execution of the instructions, the one or more processors perform operations of:
   receiving three-dimensional (3D) motion data of a scene from at least one sensor;
   identifying at least a first object in the 3D motion data;
   extracting an object track of the first object, the object track being indicative of object motion in the scene over time;
   recognizing a behavior of the first object based on the object track;
   instructions for causing the one or more processors to further perform operations of;
   identifying at least a second object in the 3D motion data;
   extracting an object track of the second object, the object track being indicative of object motion in the scene over time;
   normalizing the object tracks of each of the first and the second objects to generate first and second normalized object tracks; and
   comparing the first and second normalized object tracks to calculate behavior differences and generate behavior results indicative of relative interactions between the first and second objects.

2. The system as set forth in claim 1, wherein in normalizing the object tracks, each object track is transformed into an object-centered coordinate system.

3. The system as set forth in claim 2, wherein when the first object is a ear, the object-centered coordinate system is a car-centric coordinate system, such that a center of a stopped car is the coordinate origin and a forward direction is aligned, with a y-axis.

4. The system as set forth in claim 3, wherein the 3D motion data includes a series of input point clouds to form a 3D motion sequence.

5. The system as set forth in claim 4, wherein the memory further includes executable instructions for causing the one or more processors to further perform operations of:
   generating a set of voxel for each of a baseline point cloud and an input point cloud, each voxel having cells such that each cell of the voxel contains a population count of 3D points within the cell;
   generating a ground plane map for the baseline point cloud;
   generating a two-dimensional (2D) projection map for each voxel, wherein each 2D projection map is comprised of grids with the 2D projection map being formed such that all cells of the voxel are projected along a z-axis so that each grid in the 2D projection map has an equal number of 3D points as the cells that correspond to the grid; and
   generating difference maps by comparing the 2D projection maps with a database of known objects and behaviors.

6. The system as set forth in claim 5, wherein the memory further includes executable instructions for causing the one or more processors to further perform operations of:
   identifying, with a blob detector, a clustering of blobs as present in the difference maps; and
   classifying the blobs to identify the first object.

7. The system as set forth in claim 6, wherein in recognizing a behavior of the first object based on the object track, dynamic time warping is used to find a mapping between features in the object track $a=\{a_1, \ldots, a_I\}$ and a second track $b=\{b_1, \ldots, b_J\}$, such that an average distance $d(a_i, b_j)$ between corresponding features $a_i$ and $b_j$ is minimized.

8. The system as set forth in claim 7, wherein each track is a sequence of pixel coordinate pairs, such that $d(a_i, b_j)$ are chosen to be the Euclidean distance between $a_i$ and $b_j$, with an optimal mapping being constrained so that endpoints match with $a_1$ corresponding to $b_1$, with $a_I$ corresponding to $b_J$.

9. The system as set forth in claim 8, the optimal mapping is performed according to the following:
   letting $a'=\{a_1, \ldots, a_{I-1}\}$ and $b'=\{b_1, \ldots, b_{J-1}\}$ subtracks of a and b that contain all but their last features;
   given optimal costs $C(a',b')$, $C(a',b)$ and $C(a,b')$, determining an optimal cost $C(a,b)$ between a and b as:

$$C(a,b)=\min\{C(a',b'),C(a',b),C(a,b')\}+d(a_i,b_j);$$

initializing a two-dimensional cost matrix $C[0 \ldots I, 0 \ldots J]$ is so that $C[0, 0]=0$, $C[1 \ldots I, 0]=\infty$, and $C[0, 1 \ldots J]=\infty$, with rows and columns of C being updated in order of increasing, index, a best total cost $C(a,b)$ between tracks a and b is determined to be $C[I,J]$; and
   identifying an optimal mapping $\Phi$ between the two tracks by traversing backwards from $C[I,J]$ to $C[0, 0]$ to determine which sub-costs were chosen in the minimization.

10. A computer program product for object detection and behavior recognition system using three-dimensional motion data, the computer program product comprising computer-readable instructions stored on a non-transitory computer-readable medium that are executable by a computer having a processor for causing the processor to perform operations of:
    receiving three-dimensional (3D) motion data of a scene from at least one sensor;
    identifying at least a first object in the 3D motion data;
    extracting an object track of the first object, the object track being indicative of object motion in the scene over time;
    recognizing a behavior of the first object based on the object track;
    identifying at least a second object in the 3D motion data;

extracting an object track of the second object, the object track being indicative of object motion in the scene over time;

normalizing the object tracks of each of the first and the second objects to generate first and second normalized object tracks; and comparing the first and second normalized object tracks to calculate behavior differences and generate behavior results indicative of relative interactions between the first and second objects.

11. The computer program product as set forth in claim 10, wherein in normalizing the object tracks, each object track is transformed into an object-centered coordinate system.

12. The computer program product as set forth in claim 11, wherein when the first object is a car, the object-centered coordinate system is a car-centric coordinate system, such that a center of a stopped car is the coordinate origin and a forward direction is aligned with a y-axis.

13. The computer program product as set forth in claim 12, wherein the 3D motion data includes a series of input point clouds to form a 3D motion sequence.

14. The computer program product as set forth in claim 13, further comprising instructions for causing the one or more processors to further perform operations of:

generating a set of voxel for each of a baseline point cloud and an input point cloud, each voxel having cells such that each cell of the voxel contains a population count of 3D points within the cell;

generating a ground plane map for the baseline point cloud;

generating a two-dimensional (2D) projection map for each voxel, wherein each 2D projection map is comprised of grids with the 2D projection map being formed such that all cells of the voxel are projected along a z-axis so that each grid in the 2D projection map has an equal number of 3D points as the cells that correspond to the grid; and generating difference maps by comparing the 2D projection maps with a database of known objects and behaviors.

15. A method for object detection and behavior recognition system using three-dimensional motion data, the method comprising an act of causing a processor to execution instructions stored on a memory, such that upon execution of the instructions, the processor performs operations of:

receiving three-dimensional (3D) motion data of a scene from at least one sensor;

identifying at least a first object in the 3D motion data;

extracting an object track of the first object, the object track being indicative of object motion in the scene over time;

recognizing a behavior of the first object based on the object track;

identifying at least a second object in the 3D motion data;

extracting an object track of the second object, the object track being indicative of object motion in the scene over time;

normalizing the object tracks of each of the first and the second objects to generate first and second normalized object tracks; and comparing the first and second normalized object tracks to calculate behavior differences and generate behavior results indicative of relative interactions between the first and second objects.

16. The method as set forth in claim 15, wherein in normalizing the object tracks, each object track is transformed into an object-centered coordinate system.

17. The method as set forth in claim 16, wherein when the first object is a car, the object-centered coordinate system is a car-centric coordinate system, such that a center of a stopped car is the coordinate origin and a forward direction is aligned with a y-axis.

18. The method as set forth in claim 17, wherein the 3D motion data includes a series of input point clouds to form a 3D motion sequence.

19. The method as set forth in claim 18, further comprising an act of causing the one or more processors to further perform operations of:

generating a set of voxel for each of a baseline point cloud and an input point cloud, each voxel having cells such that each cell of the voxel contains a population count of 3D points within the cell;

generating a ground plane map for the baseline point cloud;

generating a two-dimensional (2D) projection map for each voxel, wherein each 2D projection map is comprised of grids with the 2D projection map being formed such that all cells of the voxel are projected along a z-axis so that each grid in the 2D projection map has an equal number of 3D points as the cells that correspond to the grid; and generating difference maps by comparing the 2D projection maps with a database of known objects and behaviors.

* * * * *